April 15, 1941.   W. C. WEBER   2,238,198
INSULATOR PRESS
Filed March 19, 1938   5 Sheets-Sheet 1

INVENTOR.
WALTER C. WEBER
BY
ATTORNEYS.

April 15, 1941.  W. C. WEBER  2,238,198
INSULATOR PRESS
Filed March 19, 1938  5 Sheets-Sheet 2
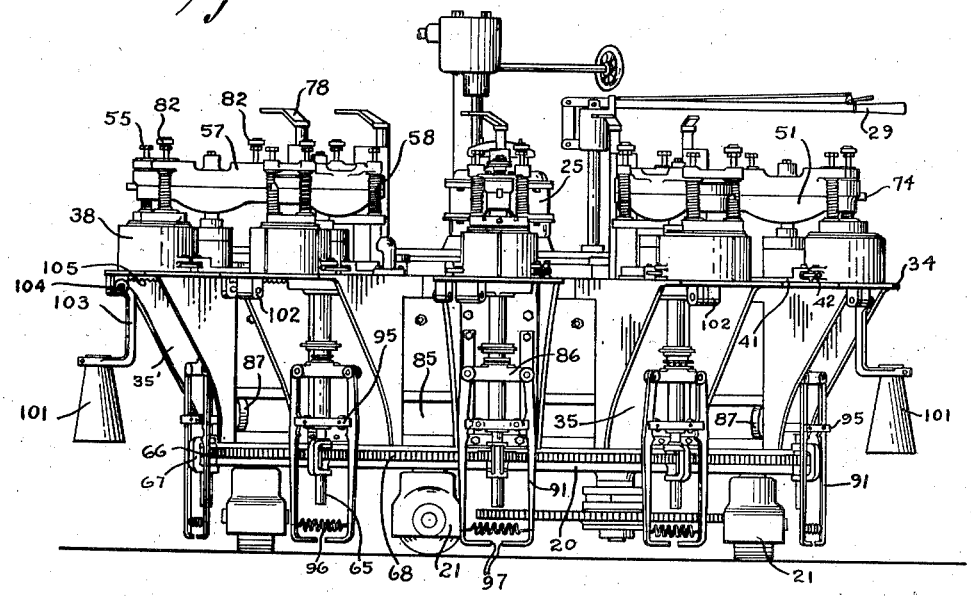
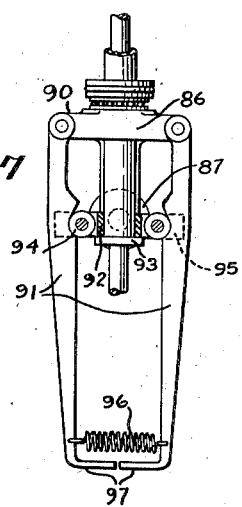
INVENTOR.
WALTER C. WEBER
BY Horsey, Cole & Garner
ATTORNEYS.

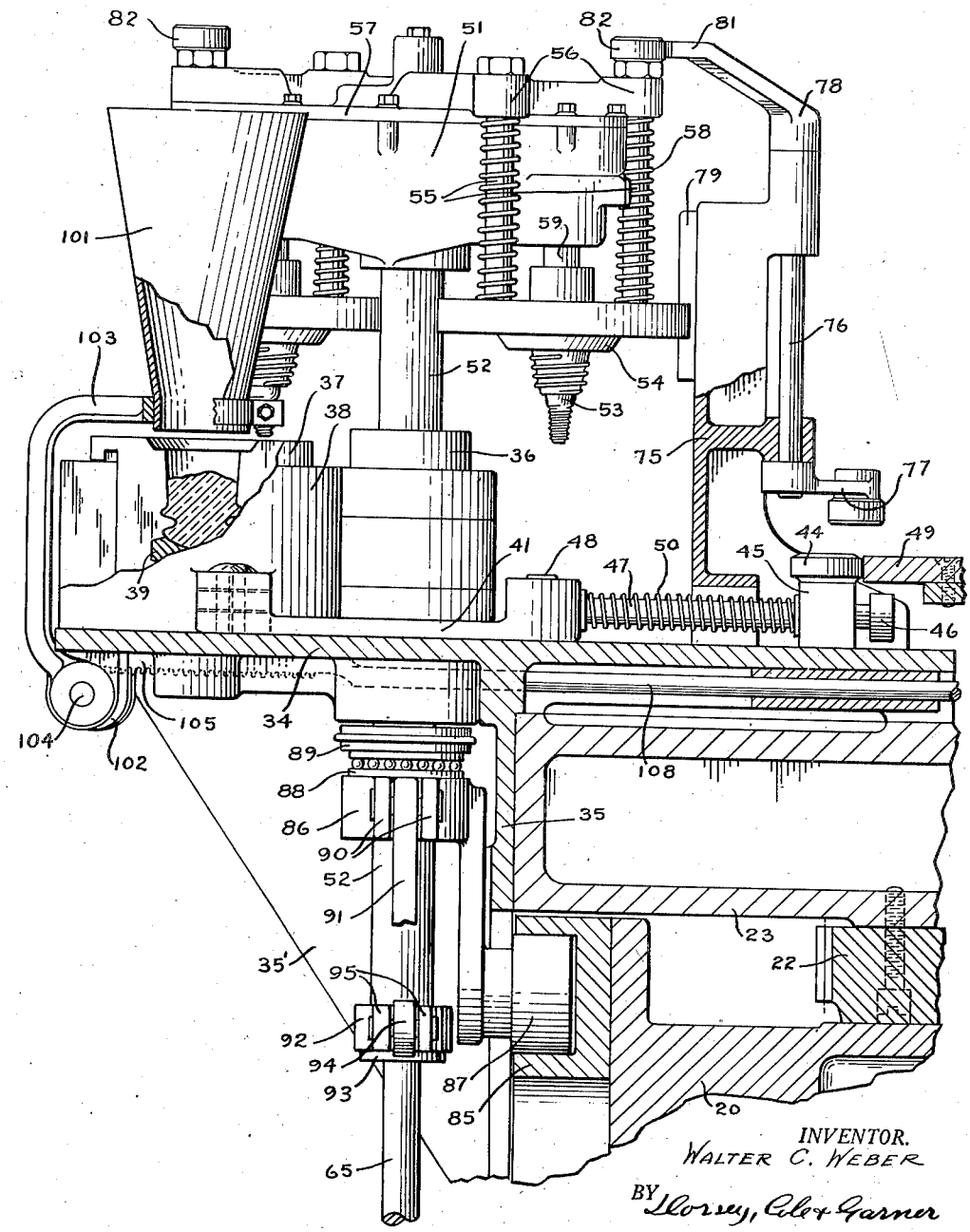

April 15, 1941.  W. C. WEBER  2,238,198
INSULATOR PRESS
Filed March 19, 1938  5 Sheets-Sheet 4

INVENTOR.
WALTER C. WEBER
BY Dorsey, Cole & Garner
ATTORNEYS.

Patented Apr. 15, 1941

2,238,198

UNITED STATES PATENT OFFICE 2,238,198

INSULATOR PRESS

Walter C. Weber, Painted Post, N. Y., assignor to Corning Glass Works, Corning, N. Y., a corporation of New York Application March 19, 1938, Serial No. 197,001

15 Claims. (Cl. 49—36)

This invention relates to glass working machinery in which the glass is shaped in whole or in part by pressing, and more particularly that group of machines adapted to form glass articles having a screw threaded section incorporated in their structure. The embodiment of the invention described in detail in the following specification is particularly adapted to form internally threaded, communication type glass insulators.

The principal object of the invention is a machine capable of producing a high quality threaded glass article in large numbers, rapidly, and with a minimum of defective pieces.

A further object of the invention is a glass press capable of continuous operation in which provision is made for retaining the pressing plunger in contact with the molded article for sufficient time to fully set the hot glass, without unduly enlarging the machine or slowing down its rate of operation.

A further object of the invention is an improved safety device for presses which will relieve the pressure applied to the press head when an obstruction is encountered yet will provide positive pressure for raising the press head under all circumstances.

A further object of the invention is a glass press of relatively low overall height which can readily be positioned directly beneath the forehearth of a glass tank to receive charges of molten glass directly therefrom.

These and other objects may be attained with a continuously rotating glass press machine having a plurality of molds positioned at spaced intervals about its periphery and each provided with an individual press head carrying a plurality of pressing plungers. These press heads are preferably raised and lowered by means of operating mechanism positioned beneath the mold table and are provided with mechanism for periodically rotating the plungers to unscrew them from the finished ware and sequentially presenting the various plungers of the press heads for operation with their respective molds. Vertical movement is preferably imparted to the press heads thru a mechanism which is positive in its displacement of the press head in an upward direction but which will be disconnected from the press head if its descent is opposed by a greater than predetermined force.

These and other features hereafter to be seen have been incorporated in the machine shown in the accompanying drawings in which:

Fig. 2 is a side elevation of the machine equipped as in Fig. 1;

Fig. 3 is a side elevation, partly in section, of the press head and mold assembly in charging position;

Fig. 7 is a detail elevation of the safety linkage in the press head operating mechanism;

Fig. 8 is a diagrammatic detail showing the relative positions of operating arms and press head rollers during pressing; and Fig. 9 is a diagrammatic detail of the same parts when the head is being raised.

Figure 1:
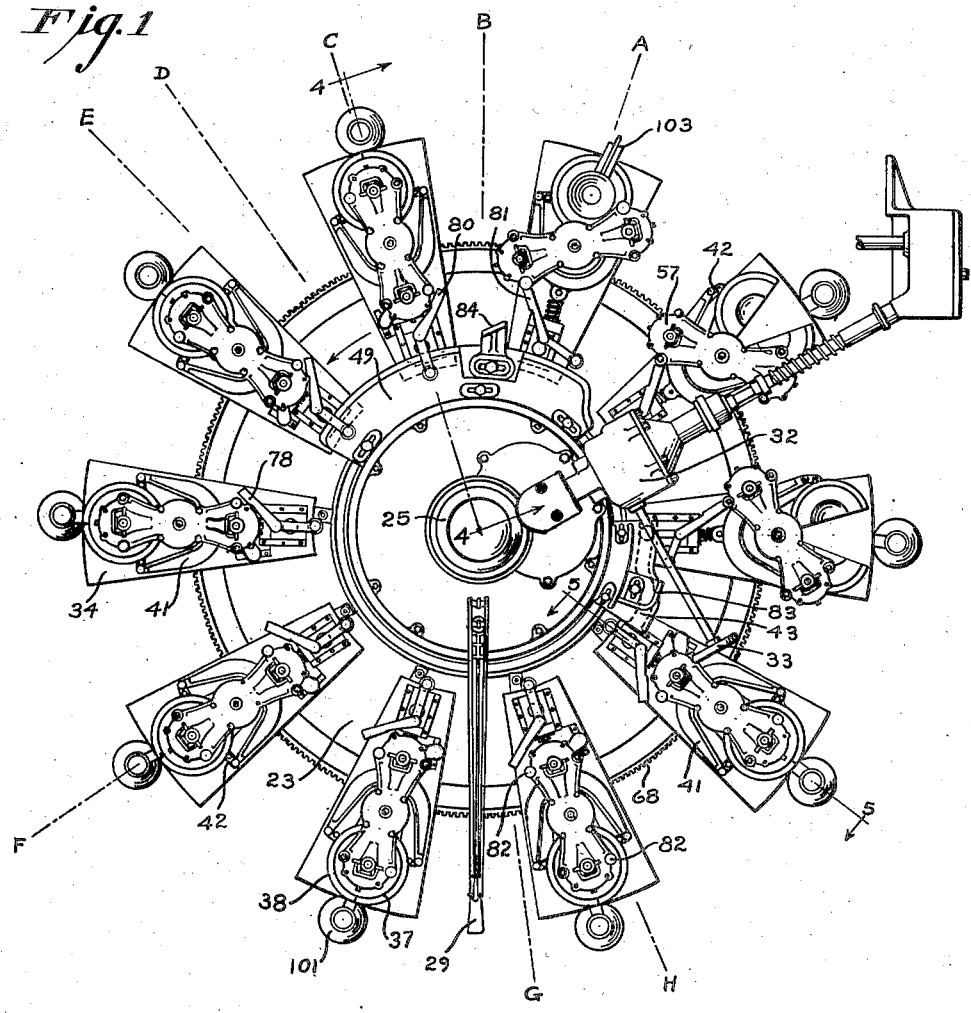
Fig. 1 is a plan view of the machine with but 10 of the usual 20 heads mounted thereon.

The machine disclosed in the accompanying drawings may be generally described as a twenty head, continuously rotating insulator press. This machine is built up around a base casting 20 which is mounted on casters 21 for movement into and out of position under the feeder forehearth. A shelf of the casting 20 provides a bearing surface and support for a ring gear 22 to which is bolted the main mold table 23. Rotation is imparted to the mold table thru pinion 24 which meshes with the ring gear 22 and is connected with the motor 25 thru reduction gear trains 26 and 27 and clutch 28. This clutch is manually operable from lever 29, mounted above the machine, by means of fork 30 engaging in groove 31. Power is supplied from this same motor to operate the feeder mechanism. This feeder drive meshes with gear train 26 and includes a differential gear box 32 operable by hand wheel 33 for synchronization of the delivery of the gobs of molten glass with the mold movements.

Since all of the mold and press head assemblies are identical, description of a single unit will suffice. Each unit is mounted on its individual frame which may be readily removed from the mold table by the simple removal of a few studs without disturbing the remaining units. These frames include a horizontal bed portion 34 clamped to the surface of the table and a guide arm 35 depending from the edge of table 23.

These parts are joined by integral webs 35'. Three independent assemblies are carried on each frame; a mold and its operating mechanism, a press head and its operating mechanism and a funnel and its operating mechanism. These will be separately described.

A hollow sleeve 36 cast as an integral part of the bed 34 serves both as a hinge pin for the mold shells 36 and as a bearing sleeve for the press head operating elements. The molds are of the conventional split type consisting of shells 36 carrying mold halves 37 which close about a base plug 39 set in an opening 40 in the bed 34. The mold shells 36 are operated by a yoke 41 whose arms are connected to the shells by links 42. The yoke and links are so proportioned that as the mold is closed a toggle action occurs which locks the mold halves in closed position. The mold is opened by cam 43, mounted on the central column of the stationary frame as shown in Fig. 1, whose U shaped track engages roller 44 pulling slide block 45 against collar 46 on rod 47 which is pinned to yoke 41 at 48. The mold is closed by cam 49 likewise mounted on frame 20 against whose outer surface the roller 44 engages as the table rotates. Movement of the slide under the influence of cam 49 compresses spring 50 and applies closing pressure to the yoke 41. If closure of the mold is prevented by a misplaced insulator or other foreign body spring 50 will be compressed to a somewhat greater extent but no harm will come to the mechanism as a whole. Under normal conditions the pressure of spring 50 moves the yoke 41 sufficeintly to close the mold halves and to a point slightly beyond that at which the links 42 are normal to the shell surface. Mold closing cam 49 extends from a point just prior to the charging station to a point beyond that at which extreme molding pressure is removed but thereafter the molds are maintained in closed position solely by the toggle action of links 42 and yoke 41.

Figure 5:
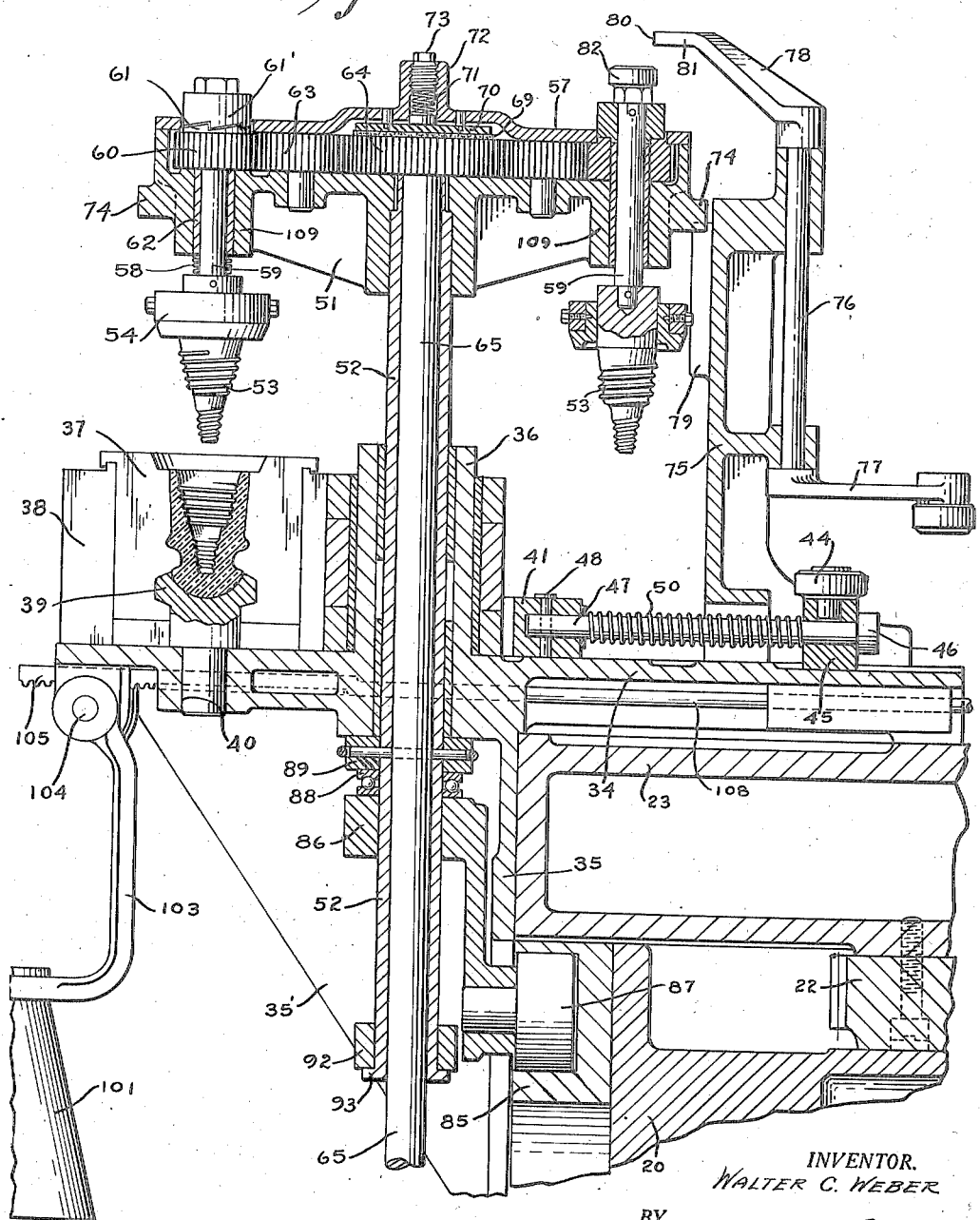
Fig. 5 is a sectional elevation thru the press head and mold assembly on line 5—5 of Fig. 1 showing the head raised after completing the pressing operation.

In the pressing mechanism a head casting 51 is centrally mounted on a sleeve 52 passing thru the sleeve 36 and carries on either end pressing plungers so located as to center in the mold cavity. Each plunger consists of a pin 53 and a ring mold 54 supported by bolts 55 which have a sliding fit in lugs 56 extending outwardly from the press head cover plate 57. Springs 58 determine the pressure with which the ring mold is forced against the mold 37. The pin 53 is attached to the lower end of shaft 59 which passes thru a bushed opening in the head casting 51. A pinion 60 whose upper surface is formed as a ratchet clutch member 61 is mounted for free rotation about the bushing 62 in which shaft 59 is journaled. This gear 60 is rotated by an intermediate pinion 63 which meshes with it and with a pinion 64 which is keyed to the end of shaft 65 journaled within the main press head operating sleeve 52. A pinion 66 splined to the lower end of this shaft is supported in a bracket 67 which is bolted to the end of the frame arm 35 to maintain the pinion 66 in mesh with ring gear 68 which extends about the base of the frame 20 and is rigidly attached thereto. As shown in Fig. 5 the upper face of the pinion 64 is provided with a friction member 69. A complemental friction disc 70 is pinned to the press head cover plate 57 and is pressed against member 69 by spring 71 adjustably confined in boss 72 by plug 73. A projecting lug 74 is provided on either end of the head casting 51 for purposes which will hereafter appear.

Near the inner end of the bed plate 34 is attached an upstanding bracket 75 in which is journaled a shaft 76 operated by a roller arm 77 and carrying a positioning arm 78. A raised boss 79 extends vertically for a limited distance along the side of the bracket adjacent the press head and is so proportioned as to engage lug 74, which extends from the press head, in the normal operating positions of this member. The outer end 80 of the positioning arm is slightly dished and, with the adjacent sides 81, is smoothly finished for contact with a roller 82 rotatably mounted on the head of one of the bolts 55. Cams 83 and 84 properly positioned about the periphery of the frame 20 control the operation and release of this member as will be more fully explained hereafter.

Vertical movement of the press head is controlled by a ring cam 85 which extends about the base of the main casting. The contours of this cam are shown in development in Fig. 6. Movement is imparted to the press head by a slide bracket 86 one end of which encircles the sleeve 52 while the other carries a roller 87 confined within the cam track. Lifting force is transmitted to the press head thru a thrust bearing 88, mounted on the upper surface of the bracket, and a collar 89 securely pinned to the sleeve 52. Pressing force is transmitted thru an over load relief mechanism which is shown in detail in Fig. 7. As will there be seen, bracket 86 is provided on either side with lugs 90 to which are pinned the thrust arms 91. A transverse head 92 encircles the lower end of sleeve 52 and is supported thereon by an integral flange 93. This transverse head carries a pair of rollers 94 which bear against the inner surface of the arms 91. Lugs 95 extend on either side of the arms and maintain the alignment of the head therewith. These thrust arms extend well beneath the end of the shaft 65 where they are held together by a spring 96. Oppositely in-turned ends 97 prevent more than a limited movement of the members toward each other under the influence of this spring. These portions of the inner surfaces of arms 91 which contact with rollers 94 are formed into cam surfaces 98 and 99 and pockets 100.

Each mold unit of the machine is provided with its individual charge guiding funnel 101 which may be swung into position above the mold opening as the unit moves beneath the feeder. In Fig. 2 the majority of these funnels have been omitted to simplify the drawings but the bearings 102 in which they are pivoted are shown beneath the bed plate 34. The funnel 101 is carried on one end of the arm 103 which is attached to one end of a shaft 104 passing thru bearings 102. A pinion, not shown, is keyed to this shaft between the bearings which act as guides for the funnel operating rack 105. The raising and lowering of the funnel is controlled by a track cam 106 mounted on the central column of the machine and engaging roller 107 on the end of rack actuating rod 108.

While each of the various cams referred to above is fixed as to its contour and extent the position of each cam on the main frame and its position relative to the others may be varied in every case except that of the ring cam 85.

Figure 6:
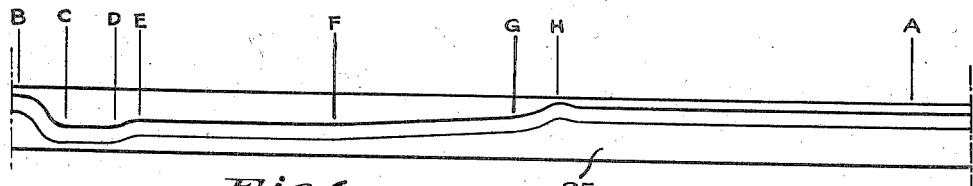
Fig. 6 is a diagrammatic development of the press head operating cam with the various operating stations marked thereon.
Figure 4:
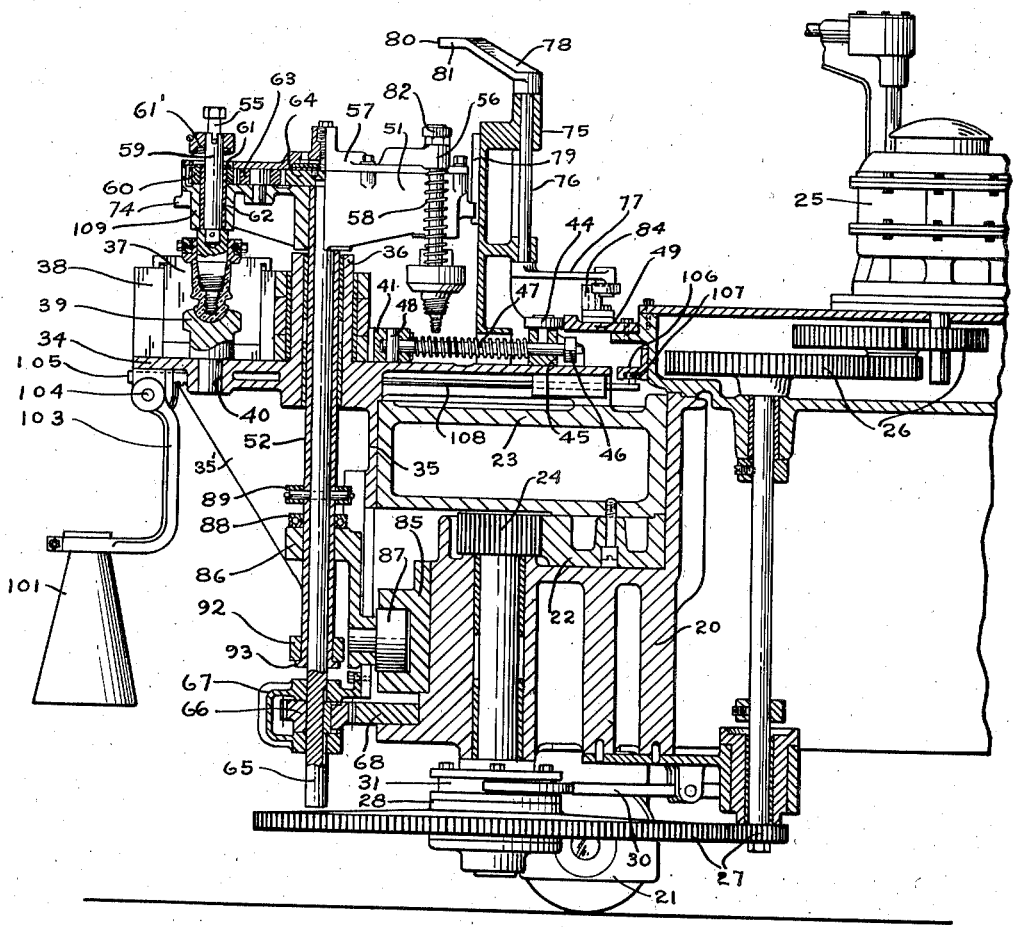
Fig. 4 is a sectional elevation on line 4—4 of Fig. 1 showing the press head in pressing position.

The operation of the machine can best be summarized with reference to the various stations indicated about the machine in Fig. 1 and marked on the development of cam 85 in Fig. 6. As will be seen, the funnel is raised and the mold charged in the neighborhood of station A. At station B the funnel has been lowered, the press head has been swung into position over the mold and the pressing operation commences. By the time station C is reached the bracket 86 has been lowered to its extreme position where it remains while the mold moves from stations C to D. Between stations D and E the bracket is raised slightly relieving the extreme pressure on the plunger but maintaining it in position thru approximately one fifth of a revolution of the machine. Between stations F and G the bracket is slowly raised while the plunger is unscrewed from the set glass article. After the plunger clears the article the press head is quickly raised between stations G and H and rotated to present a cold plunger over the mold cavity as shown in Fig. 5. The head remains in this position for a short time, sufficient for the next following press head to rotate in similar fashion, after which it is moved off center sufficiently to clear the mold and permit removal of the finished ware. The press head remains in this position until after the mold is closed and charged at station A after which it moves into pressing position and the cycle of operations commences over again.

Certain features of the operation of the machine which have been mentioned briefly above will be described in more detail. During the mold opening, discharging and charging operations, the press head is supported in raised position by collar 89 resting on thrust bearing 88 on bracket 86. In this position rollers 94 on cross head 92 are positioned in pockets 100, thrust arms 91 being drawn together by spring 96. As the bracket 86 is lowered between stations B and C the plunger 53 enters the mold and comes in contact with the charge of glass therein. This forces the plunger pin against a sleeve 109 of the head casting and tends to arrest downward movement of the press head whereupon bearing 88 drops out of contact with collar 89. However, any movement of bracket 86 relative to sleeve 52 results in displacement of arms 91 with respect to the cross head 92 which bears against flange 93. This relative movement causes rollers 94 to ride up on the cam surfaces 98 spreading arms 91 apart. This movement is resisted by spring 96 resulting in the application of a pressing force to the cross head 92 and by it to the press head 51. The amount of force applied is determined by the strength of the spring, the relative distances of the spring and cross head from the pivot point of the thrust arms and the angle of inclination of the cam surface 98. One or more of these elements may be varied to produce the maximum pressure desired. When this pressure is attained further movement of the bracket causes the rollers to mount cam surfaces 98 and, if this occurs early in the pressing stroke due to the presence of an old insulator or other foreign body in the mold, the rollers 94 will pass the high point 110 formed by the juncture of surfaces 98 and 99 and further movement of the bracket will be unopposed. When the bracket is subsequently raised the cross head 92 merely rises about sleeve 52 and no lifting force is applied to the sleeve until bearing 88 comes in contact with collar 89. No further pressing force is applied to the press head until the arms 91 have been manually separated and the rollers 94 permitted to slide below the high point 110. Thus it will be seen that it is impossible for more than a certain predetermined force to be applied to the pressing head and danger of damage to the machine from an obstructed mold is completely eliminated.

Since the present machine is intended particularly for the pressing of insulators and similar glass objects having a threaded portion incorporated therein, means are provided for rotating and simultaneously raising the plunger with respect to the mold cavity. Vertical movement is imparted to the entire press head by cam 85 operating thru bracket 86 and sleeve 52. Between stations F and G the cam track rises slowly at a uniform slope. The initial movement of the bracket brings the bearing 88 into contact with collar 89 and thereafter the entire press head assembly moves upwardly at the same rate as the bracket. Since pinion 66 is permanently in mesh with ring gear 68 which extends entirely around the machine, shaft 65 rotates continuously at uniform speed thruout the operation of the machine. This rotation is imparted to gear 64 and pinions 63 and 60 driven therefrom. Rotation of pinion 60 carrying clutch teeth 61 normally rotates plunger 53, and in such a direction as to unscrew it from the pressed ware. This rotation takes place continuously while the press head is in raised position but as it is lowered into the mold during the pressing operation the initial contact of the pin with the charge forces the plunger up against sleeve 109 and lifts the upper clutch member 61' out of engagement with pinion 60. When the press head is raised between stations F and G this action is reversed. Initial movement of the press head lifts it with respect to plunger pin 53 and causes the clutch members 61 and 61' to mesh. The slope of the cam 85 and the relative number of teeth on the various gears and pinions are so chosen with respect to the pitch of the plunger threads that the press head is raised at the rate the plunger is unscrewed and the latter is removed without damage to the threads formed in the newly pressed article.

The gear 64, shaft 65 and pinion 66 are likewise relied on to swing the press head to bring the plungers thereon in sequence over the mold. This function is performed by friction plate 70 pinned to the press head cover 57 and pressed by spring 71 against the friction disc 69 on gear 64. Since gear 64 is continuously rotating in a counter clockwise direction, as viewed in Fig. 1, there is a continuous tendency for the press head 51 to rotate in a counter clockwise direction as the table revolves. This tendency is inhibited in most instances by boss 79 on frame 75 which obstructs the passage of lug 74 on the head casting. These members maintain the head in alignment with the mold between stations B and G. At station H, however a hump in cam 85 lifts the press head sufficiently for the lug to clear the upper end of the boss and the press head assembly starts to turn under the influence of the friction disc 69. The speed of this rotation is of course limited by the rotation of the machine as a whole and the press head is immediately lowered so that the lug and boss will engage and limit its rotation to 180°.

Since the press heads are too closely spaced for more than one press head to swing at a time when all 20 molds are on the machine no further operations take place while the adjacent press head swings. However, further movement of the mold table brings roller arm 77 into contact with cam 83. As the shaft 76 is swung under the influence of this cam the positioning arm 78 which it carries swings against roller 82 on the adjacent end of the press head forcing the head to swing in a clockwise direction against the influence of friction members 69 and 70. As the head turns the roller 82 moves over the end of the arm and catches in the dished surface 80 where it remains until the roller arm 77 is displaced by cam 84. Thereupon the head turns once more under the influence of the friction members until lug 74 and boss 79 engage and the cooler plunger is again positioned over the mold cavity.

A machine having the features described above has been found to have many advantages. It is well known that in the pressing of many forms of glassware the plunger is heated to much higher temperatures than the mold and the speed of operation of a machine is determined by the time required to cool the plunger. This is particularly true where a relatively small plunger is used and it is necessary to set up an accurate surface within a relatively heavy body of hot glass, as in insulator pressing. By mounting a plurality of pressing plungers above each mold and allowing a full cycle of machine operation for cooling of the last used plunger the rate of production of a given number of molds may be materially increased.

Further advantages are found in the action of the positioning arm in displacing the press head from over the mold. This action permits direct charging of the mold in a straight line from the feeder and eliminates any necessity for a complicated system of chutes and guides such as some prior art machines have required. The funnels 101 have a sufficiently large opening so that the gob from the feeder can fall therein without striking the edge of the funnel despite the continuous rotation of the mold table.

Still further advantages are found in the safety devices incorporated in the mold closing and press head operating mechanism which insure the protection of the various parts even in the face of faulty operation of other parts of the machine and its associated take out and charging devices.

Still further advantages are found in the toggle mechanism incorporated in the mold operating mechanism which eliminates the necessity for mold operating cams about the entire periphery of the machine.

While a particular embodiment of the invention has been described in detail it will be apparent to those skilled in the art that many changes in construction, location and arrangement of parts might be made while retaining the features and following the principles of the present invention. Accordingly it should be understood that this disclosure is by way of illustration and the invention is to be limited solely by the scope of the appended claims.

I claim:

1. In an apparatus for pressing glass, in combination, a continuously rotating mold table, a plurality of press molds mounted thereon, a press head individual to each mold, each press head having a plurality of arms and a plunger mounted on each arm, means individual to each press head for rotating the same to present the plungers in sequence over the associated mold, and means common to all the press heads for controlling their rotation.

2. In an apparatus for pressing glass, in combination, a continuously rotating table, a plurality of mold units mounted thereon, each mold unit comprising a mold, a press head pivotally mounted adjacent said mold, a plurality of plungers mounted on said press head, means tending to rotate said press head with respect to said mold and stop means adapted to position said press head with a plunger in alignment with the mold cavity; and means common to all of the mold units for periodically releasing said press head from said stop means thereby permitting said press head rotating means to function.

3. In an apparatus for pressing glass, a continuously rotating table, a press mold thereon, a press head mounted on said table adjacent said mold, a plurality of plungers mounted on said press head, continuously rotating means in frictional contact with said press head and tending to position said plungers sequentially over said mold, stop means normally holding said press head against rotation and stationary cam means controlling the vertical position of said press head and adapted to sequentially lower said press head into pressing position and release it from the control of said stop means.

4. In an apparatus for pressing threaded glass articles, in combination, a continuously rotating table, a mold mounted thereon, a press head mounted on said table adjacent said mold, a threaded plunger mounted on said press head, continuously rotating means mounted on said press head, means for raising and lowering said press head to press a charge in said mold and clutch means operable by said movement of the press head for connecting said plunger with and disconnecting it from said rotating means.

5. In an apparatus for pressing threaded glass articles in combination, a continuously rotating table, a mold mounted thereon, a press head mounted on said table adjacent said mold, a threaded plunger mounted on said press head, a continuously rotating clutch member on said press head, a second clutch member connected to said plunger, and a lost motion connection between said plunger and said press head whereby said clutch members are disconnected as the plunger is pressed against the mold charge and are reconnected as the plunger is withdrawn from the mold.

6. In an apparatus for pressing threaded glass articles, in combination, a stationary frame, a mold table rotatable on said frame, means for continuously rotating said table, a press mold mounted on said table, a press head pivotally mounted adjacent thereto, a shaft associated with said press head and being rotatable on movement of the mold table, clutch means for imparting rotation to said plunger from said shaft and further clutch means for rotating said press head from said shaft.

7. In apparatus for pressing glass, in combination, a continuously rotatable mold table, a press mold mounted thereon, a press head rotatably mounted thereon adjacent said mold, said press head having a plurality of arms adapted to overlie said mold, rotatable means associated with said press head and tending to rotate it with respect to said mold, stop means associated with said press head and adapted to position an arm thereof in alignment with the mold and supplemental positioning means adapted to move said press head out of alignment with said mold and in a direction opposite to that induced by the aforesaid rotatable means.

8. In apparatus for pressing glass, in combination, a continuously rotatable mold table, a press mold mounted thereon, a press head rotatably mounted thereon adjacent said mold, said press head having a plurality of arms adapted to overlie said mold, rotatable means associated with said press head and tending to rotate it with respect to said mold, stop means associated with said press head and adapted to position an arm thereof in alignment with the mold and supplemental positioning means adapted to move said press head out of alignment with said mold and in a direction opposite to that induced by the aforesaid rotatable means, said positioning means and said rotatable means cooperating to retain the press head in displaced position during take out and charging operation.

9. In apparatus for pressing glass, in combination, a continuously rotatable mold table, a press mold mounted thereon, a press head rotatably mounted thereon adjacent said mold, said press head having a plurality of arms adapted to overlie said mold, rotatable means associated with said press head and tending to rotate it with respect to said mold, stop means associated with said press head and adapted to position an arm thereof in alignment with the mold and supplemental positioning means adapted to move said press head out of alignment with said mold and in a direction opposite to that induced by the aforesaid rotatable means, said positioning means comprising a cam actuated lever arm adapted to engage a portion of the press head mechanism.

10. In a machine for pressing glass, in combination, a mold, a press head mounted adjacent said mold and adapted to be brought into alignment therewith, a press head operating member, positive means for raising and lowering said member, means operable by said member for positively raising said press head and releasable means connected to said member for transmitting a pressing force to said press head.

11. In a machine for pressing glass, in combination, a rotatable mold table, a mold mounted thereon, a press head pivotally mounted adjacent said mold, said press head mounting comprising a press head operating means, positive means associated with said mounting for raising said press head, and releasable means associated with said mounting for lowering said press head and developing pressing forces in said mold.

12. In a machine for pressing glass, in combination, a mold, a press head mounted adjacent said mold and adapted to be brought into alignment therewith, said mounting means comprising a sleeve, a bracket associated with said sleeve and adapted to move longitudinally thereof, a collar on said sleeve limiting the extent of movement of the bracket along said sleeve in one direction and releasable means resisting movement of the bracket in the opposite direction with respect to said sleeve.

13. In a machine for pressing glass, in combination, a mold, a press head mounted adjacent said mold and adapted to be brought into alignment therewith, said mounting means comprising a sleeve, a bracket associated with said sleeve and adapted to move longitudinally thereof, a collar on said sleeve limiting the extent of movement of the bracket along said sleeve in one direction and releasable means resisting movement of the bracket in the opposite direction, said releasable means comprising a member carried by said sleeve and spring pressed thrust members connected to said bracket.

14. In a machine for pressing glass, in combination, a mold, a press head mounted adjacent said mold and adapted to be brought into alignment therewith, said mounting means comprising a sleeve, a bracket associated with said sleeve and adapted to move longitudinally thereof, a collar on said sleeve limiting the extent of movement of the bracket along said sleeve in one direction and releasable means resisting movement of the bracket in the opposite direction, said releasable means comprising a thrust member carried by said sleeve and thrust arms connected to said bracket, said thrust arms being spring pressed against said thrust member and having inclined projections on their contacting surfaces tending to oppose relative movement between said thrust arms and thrust head.

15. In an apparatus for pressing threaded glass articles in combination, a continuously rotating mold table, a mold mounted thereon, a vertically movable press head mounted on said table adjacent said mold, a threaded plunger mounted on said press head for movement therewith and relative thereto, continuous rotating means mounted on said press head for movement therewith and means controlled by the movement of said plunger relative to said press head for disconnecting said plunger and rotating means as the plunger is forced into the mold and for connecting said parts after the pressing operation as the press head is raised to withdraw said plunger from said mold.

WALTER C. WEBER.